Patented Feb. 8, 1949

2,460,825

UNITED STATES PATENT OFFICE 2,460,825

ACYLATING FURAN

Howard D. Hartough, Pitman, N. J., and Alvin I. Kosak, Columbus, Ohio, assignors to Socony-Vacuum Oil Company, Incorporated, a corporation of New York No Drawing. Application June 20, 1946, Serial No. 678,158

14 Claims. (Cl. 260—345)

This invention relates to a process for the acylation of furans and, more particularly, is directed to a catalytic method for acylating furan and its derivatives in the presence of a small amount of a porous absorptive silica-hydrous metallic oxide.

Acylation reactions are well known in the art and connote the union between acyl radicals and molecules of organic compounds under conditions of temperature, pressure and time ordinarily referred to in the art as acylating conditions. The compounds thus produced represent structurally the substitution of the original acyl radical for a hydrogen atom on the organic compound molecule.

As a general rule, the temperature, pressure and time of reaction employed in acylation operations depend upon whether the acylation is effected in the absence or presence of catalysts. The two methods are generally referred to as thermal and catalytic acylation, respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids and acyl halides have served as sources of the acyl radical. In particular, acetic anhydride and acetyl chloride have found wide application as acylating agents.

The acylation of furan and furan derivatives has previously been carried out employing one of the above-mentioned acylating agents in the presence of various catalysts including stannic chloride, ferric chloride, aluminum chloride and titanium tetrachloride.

These catalysts, although applicable with considerable success in the acylation of aromatic hydrocarbons, are only moderately successful where furan is involved. It has been postulated that this may be accounted for by the fact that compounds such as aluminum chloride form addition complexes with the ether linkage in furan substantially decreasing the yield of desired product and requiring a considerable excess of aluminum chloride over the theoretical amount required for the acylation reaction. Thus, when aluminum chloride is used as the condensing agent, the ratio of catalyst to acyl chloride is at least one and, in the case of acid anhydrides, at least two. Likewise, other catalysts of the Friedel-Crafts type must be used in molecular quantities with respect to the acylating agent being employed in the acylation of furan. Moreover, in using the above catalysts, it has been necessary to confine the acylation process to a batch operation.

It has now been discovered that acylated furans may be obtained in an efficient manner by reacting the furan to be treated with an acylating agent in the presence of a porous absorptive silica-hydrous metallic oxide catalyst. It has been found that by using said catalyst, the above-mentioned difficulties encountered in the acylation of furans have largely been overcome. It would appear that the advantages obtained using a silica-hydrous metallic oxide catalyst can be attributed to the fact that relatively small quantities of this material can be used as an effective catalyst in the acylation of furans. It has been found that silica-hydrous metallic oxide composites effect the acylation of furans without accompanying formation of complex addition products formerly encountered in catalytic acylation processes. It has been found, in accordance with this invention, that silica-hydrous metallic oxide composites employed in relatively small amounts in comparison to the quantity of furan or acylating agent used effects the acylation of furan and that such composites are readily reactivated, lending themslves to a continuous acylation operation. Thus, silica-alumina, silica-zirconia, silica-thoria, and like catalysts contemplated for use herein may, after employment in promoting the acylation reaction, be reactivated by conventional means. A continuous process of acylation employing such catalysts may thus be used by alternate steps of carrying out the acylation, followed by reactivation of the catalyst.

It is accordingly an object of the present invention to provide an efficient process for synthesizing acylated furans. Another object is to provide a process for catalytically acylating furan and its derivatives. A still further object is to afford a process for catalytically acylating furan in a direct manner that can be easily carried out using a relatively inexpensive catalyst in small amounts. A very important object is to provide a catalytic process for acylating furan in the presence of a catalyst which can be easily reactivated and thus lend itself to use in a continuous operation.

These and other objects which will be recognized by those skilled in the art are attained in accordance with the present invention wherein furan or its derivatives are acylated by reaction with organic carboxylic acid anhydrides in the presence of a porous absorptive silica-hydrous metallic oxide catalyst.

The catalyst to be used herein may be either a naturally occurring deposit or a synthetic gel composite of silica and one or more hydrous metallic oxides. Thus, naturally occurring silica-alumina clays of the montmorillonite type which have been activated have been found to be effective catalysts for promoting the acylation of furans. Typical of such products is the material sold under the trade name of Super-Filtrol. Other clays contemplated for use in the present process include fuller's earth, attapulgus clay and glauconite. In addition to the naturally occurring clays, synthetic silica-hydrous metallic oxide catalysts such as those extensively employed in the cracking of petroleum hydrocarbons may be used. These catalysts are synthetic porous absorptive composites of silica and a metallic oxide and may be formed in various ways as, for example, precipitating silica on the hydrous oxide, or the hydrous oxide on silica, or by combining a silica gel with the hydrous oxide, or by preparing a silica-hydrous oxide gel. Gel composites suitable for use as catalysts in the present invention include silica in combination with zirconia, alumina, titania, thoria, and the like. The synthetic or naturally occurring silica-hydrous metallic oxide catalysts are employed in the process of this invention usually in a finely divided form and in amounts between about 1 and about 25 per cent, based on the weight of the reactants.

The acylating agents to be used herein are organic carboxylic acid anhydrides. Included in this category are compounds such as the ketenes having the basic structural formula

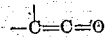

and which, upon addition of water, yield organic carboxylic acids. These acylating agents may be derived by methods well known to the art from mono- or polybasic organic acids which may be either unsaturated or saturated. Thus, representative acylating agents to be used in this invention include the anhydrides of saturated fatty acids, such as acetic anhydride, propionic anhydride, ketene, etc.; the anhydrides of unsaturated fatty acids, such as crotonic anhydride; and the anhydrides of dibasic acids, such as phthalic anhydride. These acylating agents are given merely by way of examples and are not to be construed as limiting, since other carboxylic acid anhydrides which will readily suggest themselves to those skilled in the art may be used.

In addition to furan itself, derivatives of furan having one or more substituent groups, such as halogen, alkyl, aryl, or alkoxy groups attached to the furan ring may likewise be acylated in accordance with this invention. Other furan derivatives, including those having substituents of a highly negative character, such as carbonyl, ester, nitro and cyano groups, may likewise be acylated in the presence of silica-hydrous metallic oxide composites.

The temperature at which the reaction is carried out may vary over a wide extent, the upper limit being dependent on the boiling point of the reactants at the specific pressure of the reaction. Temperatures varying between about −30 and about 150° C. have been found satisfactory for effecting the acylation. However, generally it is preferable to employ temperatures in the lower range of from about 0° C. to about 50° C. Pressures between about 1 and about 10 atmospheres have been found satisfactory for effecting the acylation reaction. The effect of increased pressure, theoretically, is toward increased reaction but, from a practical standpoint, this is not a very great effect with reactions such as involved herein, which go readily at normal pressures. The temperature to be employed will depend on the time of reaction and the nature of the acylating agent used. Ordinarily, a pressure sufficient to maintain the reactants in the liquid phase is employed and this is more or less dependent upon the particular temperature involved. As a general rule, the higher the temperature, the higher the pressure and the lower the reaction time that is needed. It is, of course, to be understood that these reaction variables are more or less interdependent. Under the conditions encountered in the process of this invention, however, the reaction period will generally vary from about 1 to about 10 hours.

The silica-hydrous metallic oxide catalyst used herein may be employed in amounts as small as 1 per cent by weight of the reactants. The catalyst will consist predominantly of silica. One or more of the above-mentioned metallic oxides will be present in the catalyst, generally in an amount less than about 40 per cent by weight of the catalyst employed. The weight ratio of silica to hydrous metallic oxide used will, in general, accordingly be not less than 3:1 and preferably between about 4:1 and about 20:1.

The catalyst when used should preferably have a fairly small particle size. After continued use in the acylation process, the silica-hydrous metallic oxide catalyst becomes spent due to the deposition of impurities on its surface and may be reactivated by heating in air at an elevated temperature sufficient to burn off the impurities and hence restore the catalyst to its original activity. The original catalyst may accordingly be re-used a considerable number of times before it degenerates completely and must be discarded. The acylation process described herein may be carried out either in a batch or continuous operation. In the former instance, the furan is contacted with an organic carboxylic acid anhydride in the presence of a silica-hydrous metallic oxide catalyst and the reactants are heated for a time sufficient to effect acylation. The catalyst is then removed from the reaction product mixture and said mixture is distilled to yield the acylated furan. In a continuous operation, the reactants are contacted with a bed of the catalyst and allowed to remain in contact with said catalyst at a temperature and for a time sufficient to effect acylation. The reaction products are then removed from the catalyst bed and subjected to distillation. Unreacted furan is recycled, together with a fresh reaction mixture of this compound and an acylating agent.

The following detailed examples are for the purpose of illustrating modes of effecting the acylation of furan in accordance with the process of this invention. It is to be clearly understood that this invention is not to be construed as limited to the specific acylating agents used or the specific conditions set forth in the examples.

*Example 1*

A mixture of 34 grams (0.5 mole) of furan, 107 grams (1 mole) of 95 per cent acetic anhydride, and 1 gram of Super-Filtrol clay was heated over a temperature range of from 17 to 20° C. for a period of 3½ hours. At the end of this time, the reaction product mixture was cooled and the clay residue removed by filtration. The resulting solution was distilled under reduced pressure, yielding 8 grams of 2-acetylfuran.

*Example 2*

A mixture of 34 grams (0.5 mole) of furan, 107 grams (1 mole) of 95 per cent acetic anhydride, and 5 grams of Super-Filtrol clay was heated at a temperature of 39–44° C. for a period of 3 hours. At the end of this time, the reaction product mixture was cooled, the catalyst removed by filtration, and the resulting solution distilled under reduced pressure to yield 13 grams of 2-acetylfuran.

*Example 3*

A mixture of 34 grams of furan (0.5 mole), 107 grams (1 mole) of 95 per cent acetic anhydride, and 5 grams of Super-Filtrol clay was maintained at a temperature of 20° C. for a period of 6 hours. At the end of this time, the clay residue was removed by filtration and the resulting solution distilled under reduced pressure, yielding 12 grams of 2-acetylfuran.

*Example 4*

A mixture of 34 grams of furan (0.5 mole), 107 grams (1 mole) of 95 per cent acetic anhydride, and 2.5 grams of a finely ground synthetic silica-alumina gel composite was heated at a temperature of from 40–50° C. for a period of 3 hours. At the end of this time, the reaction mixture was cooled, the catalyst removed by filtration, and the resulting solution distilled under reduced pressure to yield 5 grams of 2-acetylfuran.

*Example 5*

A mixture of 34 grams of furan (0.5 mole), 107 grams (1 mole) of 95 per cent acetic anhydride, and 10 grams of glauconite were heated at a temperature of 44–45° C. for a period of 3 hours. At the end of this time, the reaction mixture was cooled, the catalyst removed by filtration, and the resulting solution distilled under reduced pressure to yield 5 grams of 2-acetylfuran.

From the above examples, it will be seen that silica-hydrous metallic oxide composites are effective catalysts for the acylation of furan. Likewise, furan derivatives having one or more substituent groups attached to the furan ring may be acylated in accordance with this invention. The acylated furans as produced in accordance with the process described herein have found a variety of uses and may be employed as solvents, addition agents for petroleum fractions, plasticizers, resin intermediates, and intermediates for chemical synthesis. Long chain alkyl furyl ketones may be used as synthetic lubricants, dielectrics, waxes and extreme pressure additives for mineral oils.

We claim:

1. A process for acylating furan with acetic anhydride in the presence of between about 1 and about 25 per cent by weight of a silica-alumina catalyst.

2. A process for acylating furan comprising reacting the same with a fatty acid anhydride in the presence of from about 1 to about 25 per cent by weight of a silica-alumina catalyst at a temperature between about 0° C. and about 50° C. for a period between about 1 and about 10 hours.

3. A process for acylating furan comprising reacting the same with acetic anhydride in the presence of from about 1 to about 25 per cent by weight of a silica-alumina catalyst at a temperature between about 0° C. and about 50° C. for a period between about 1 and about 10 hours.

4. A process for nuclear acylation of an acylatable furan comprising reacting the same with an organic carboxylic acid anhydride in the presence of glauconite.

5. A process for nuclear acylation of an acylatable furan comprising reacting the same with an organic carboxylic acid anhydride in the presence of from about 1 to about 25 per cent by weight of a porous absorptive silica-alumina composite.

6. A process for acylating furan comprising reacting the same with an organic carboxylic acid anhydride in the presence of a porous absorptive silica-alumina composite.

7. A process for acylating furan comprising reacting the same with an organic carboxylic acid anhydride in the presence of glauconite.

8. A process for acylating furan comprising reacting the same with an organic carboxylic acid anhydride in the presence of a porous absorptive synthetic silica-alumina gel composite.

9. A process for acylating furan comprising reacting the same with an organic carboxylic acid anhydride in the presence of from about 1 to about 25 per cent by weight of a porous absorptive silica-alumina catalyst, the silica-alumina ratio of which is between about 3:1 and about 20:1.

10. A process for nuclear acylation of an acylatable furan, comprising reacting the same with an organic carboxylic acid anhydride in the presence of a porous absorptive silica-alumina clay.

11. A process for nuclear acylation of an acylatable furan, comprising reacting the same with an organic carboxylic acid anhydride in the presence of a porous absorptive silica-alumina composite.

12. A process for nuclear acylation of an acylatable furan, comprising reacting the same with an organic carboxylic acid anhydride in the presence of a porous absorptive synthetic silica-alumina gel.

13. A process for nuclear acylation of an acylatable furan, comprising reacting the same with an organic carboxylic acid anhydride in the presence of a porous absorptive silica-alumina catalyst, the silica-alumina ratio of which is between about 3:1 and about 20:1.

14. A process for nuclear acylation of an acylatable furan, comprising reacting the same with a fatty acid anhydride in the presence of a porous absorptive silica-alumina composite.

HOWARD D. HARTOUGH.
ALVIN I. KOSAK.

REFERENCES CITED

The following references are of record in the file of this patent:

UNITED STATES PATENTS

| Number | Name | Date |
|---|---|---|
| 2,349,904 | Hackmuth | May 30, 1944 |

OTHER REFERENCES

Gilman, "Organic Chemistry," ed. 2, vol. 1, pages 181–183, J. Wiley, New York, 1943.

Chemical Reviews, vol. 17, 1935, pages 360–361, and 374 to 377.